US012627504B2

(12) United States Patent
Goodman et al.

(10) Patent No.: US 12,627,504 B2
(45) Date of Patent: May 12, 2026

(54) KEY POSSESSION BASED VERIFICATION IN ENDPOINT DEVICES

(71) Applicant: Dell Products L.P., Round Rock, TX (US)

(72) Inventors: Bradley K. Goodman, Nashua, NH (US); Eric Joseph Bruno, Shirley, NY (US); Joseph Caisse, Burlington, MA (US)

(73) Assignee: Dell Products L.P., Round Rock, TX (US)

( * ) Notice: Subject to any disclaimer, the term of this patent is extended or adjusted under 35 U.S.C. 154(b) by 471 days.

(21) Appl. No.: 18/341,975

(22) Filed: Jun. 27, 2023

(65) Prior Publication Data

US 2025/0007726 A1 Jan. 2, 2025

(51) Int. Cl.
*H04L 9/32* (2006.01)

(52) U.S. Cl.
CPC .......... *H04L 9/3247* (2013.01); *H04L 9/3234* (2013.01); *H04L 9/3271* (2013.01)

(58) Field of Classification Search
CPC .... H04L 9/3247; H04L 9/3234; H04L 9/3271
See application file for complete search history.

(56) References Cited

U.S. PATENT DOCUMENTS

| | | | | |
|---|---|---|---|---|
| 10,855,674 B1 * | 12/2020 | Geusz | ..................... | H04L 63/20 |
| 10,972,458 B1 * | 4/2021 | Gaeta | ..................... | G06F 21/32 |
| 11,050,570 B1 * | 6/2021 | Totah | ................... | H04L 9/3215 |

| | | | | |
|---|---|---|---|---|
| 11,556,323 B1 * | 1/2023 | Frey | ......................... | G06F 21/64 |
| 2006/0085634 A1 * | 4/2006 | Jain | ........................ | H04L 9/3263 |
| | | | | 713/156 |
| 2014/0044265 A1 * | 2/2014 | Kocher | ............... | H04L 63/0823 |
| | | | | 380/277 |
| 2015/0074764 A1 * | 3/2015 | Stern | ........................ | H04L 63/06 |
| | | | | 726/4 |
| 2015/0256345 A1 * | 9/2015 | Vaid | ...................... | H04L 9/3268 |
| | | | | 713/158 |
| 2017/0347266 A1 * | 11/2017 | Petel | ...................... | B60R 25/241 |
| 2018/0041484 A1 * | 2/2018 | Gifford | ................. | H04L 9/3247 |
| 2018/0234843 A1 * | 8/2018 | Smyth | ................... | H04W 12/03 |
| 2018/0255101 A1 * | 9/2018 | Adam | ................. | G06F 21/6218 |
| 2020/0186357 A1 * | 6/2020 | Laitinen | ............... | H04L 9/0643 |
| 2023/0016837 A1 * | 1/2023 | Gamishev | ............. | H04L 63/102 |
| 2023/0319018 A1 * | 10/2023 | Gourlay | ............. | H04L 63/0823 |
| | | | | 713/168 |
| 2023/0344817 A1 * | 10/2023 | Goodman | ............. | H04L 9/0825 |
| 2024/0171406 A1 * | 5/2024 | Bercik | ................. | G06F 21/577 |

FOREIGN PATENT DOCUMENTS

| | | | | | |
|---|---|---|---|---|---|
| EP | | 4589462 A1 * | 7/2025 | ........... | H04L 9/0825 |

* cited by examiner

*Primary Examiner* — Khalid M Almaghayreh
(74) *Attorney, Agent, or Firm* — WOMBLE BOND DICKINSON (US) LLP

(57) ABSTRACT

Methods and systems for securing endpoint devices are disclosed. To secure the endpoint devices, multiple processes for validating authority to invoke performance of commands may be implemented. The processes may include request based processes and challenge response based processes. In the challenge response based processes, an invoker of a command may establish authority for invoking the command by showing possession of a key to which the authority for the command has been delegated and that is usable to verify signatures included in responses to challenges to the invoked commands.

20 Claims, 5 Drawing Sheets

KEY POSSESSION BASED VERIFICATION IN ENDPOINT DEVICES

FIELD

Embodiments disclosed herein relate generally to security. More particularly, embodiments disclosed herein relate to securing performance of commands by devices.

BACKGROUND

Computing devices may provide computer-implemented services. The computer-implemented services may be used by users of the computing devices and/or devices operably connected to the computing devices. The computer-implemented services may be performed with hardware components such as processors, memory modules, storage devices, and communication devices. The operation of these components and the components of other devices may impact the performance of the computer-implemented services.

BRIEF DESCRIPTION OF THE DRAWINGS

Embodiments disclosed herein are illustrated by way of example and not limitation in the figures of the accompanying drawings in which like references indicate similar elements.

DETAILED DESCRIPTION

Figure 1:
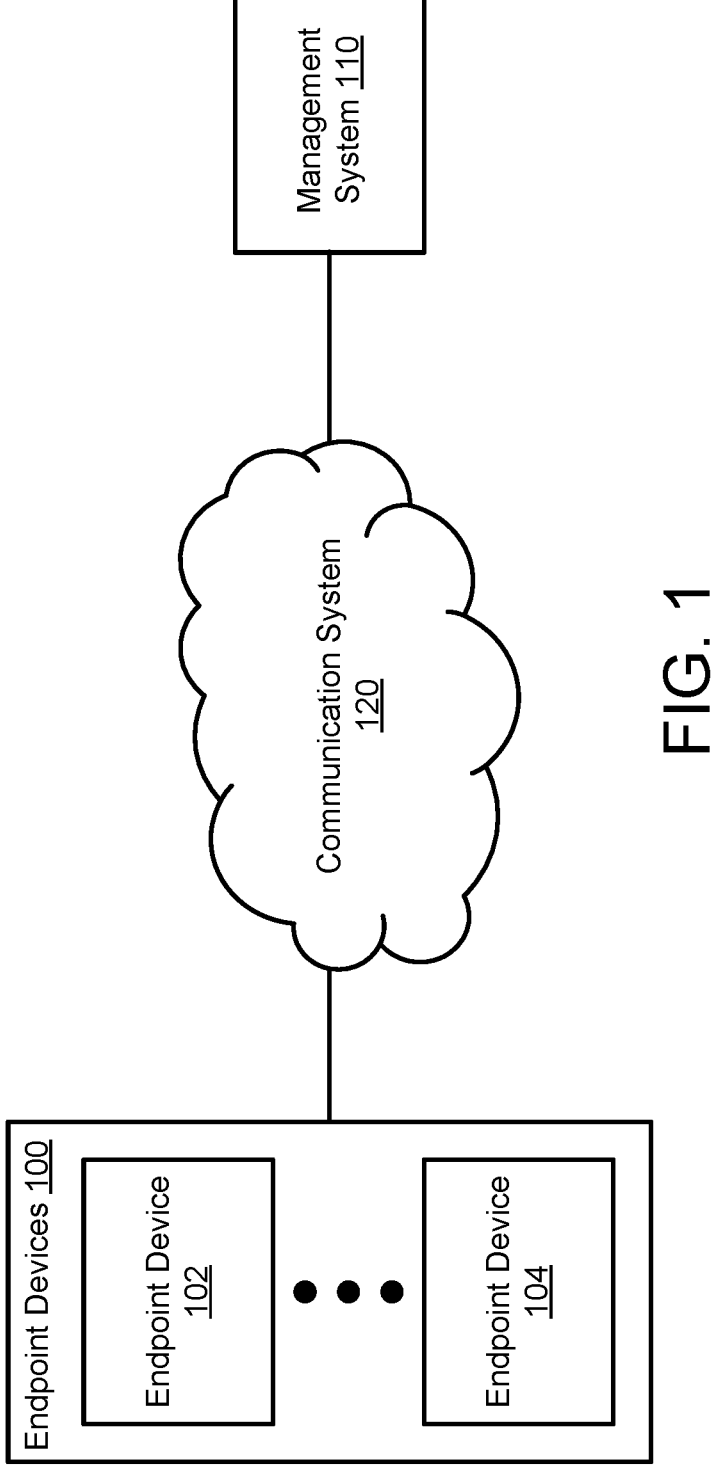
FIG. 1 shows a block diagram illustrating a system in accordance with an embodiment.

Various embodiments will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment. The appearances of the phrases "in one embodiment" and "an embodiment" in various places in the specification do not necessarily all refer to the same embodiment.

References to an "operable connection" or "operably connected" means that a particular device is able to communicate with one or more other devices. The devices themselves may be directly connected to one another or may be indirectly connected to one another through any number of intermediary devices, such as in a network topology.

In general, embodiments disclosed herein relate to methods and systems for securing operation of endpoint devices using a flexible approach. The flexible approach may allow for commands to be invoked by users of endpoint devices without requiring the user to establish requests for the commands.

To secure the operation of the endpoint device, invocations of commands may be challenged. To pass the challenge, an invoker of the command may be required to establish possession of a key to which authority for the commands has been delegated.

To respond to the challenge, the invoker of the command may sign the challenge with a key. The endpoint device may attempt to establish a chain of delegations of authority for the command to a public key that is both usable to validate the signature in the response and usable to validate signed responses (as opposed to signed requests for performance of commands).

If successfully established, then the endpoint device may proceed to perform the invoked command. Otherwise, the endpoint device may deny performance of the invoked command.

By doing so, embodiments disclosed herein may secure endpoint devices while providing flexibility in how authority for invoking of commands may be established. For example, by only requiring that the invoker of a command establish possession of a key to which authority has been delegated for the command, the complexity of invoking performance of commands may be reduced. For example, a user may only need to invoke commands through captive interfaces rather than being required to have access to systems through which requests for performance of commands may be generated.

Thus, embodiments disclosed herein may address, among other technical problems, the technical problem of security in distributed systems. By providing for flexibility through which authority for command invocation can be established, the usability of endpoint devices may be improved while retaining security in operation of the endpoint devices.

In an embodiment, a method for managing operation of an endpoint device is provided. The method may include presenting a challenge based on a command that is to be performed by the endpoint device to a user; making a determination regarding whether a response to the command comprises a signature that is verifiable using a key associated with a possession based permission for the command; in a first instance of the determination where the response comprises the signature that is verifiable using a key associated with the possession based permission for the command: initiating performance of the command; and in a second instance of the determination where the response does not comprise the signature that is verifiable using a key associated with the possession based permission for the command: denying the performance of the command.

The method may also include obtaining user input via an interface, the user input indicating the command to be performed by the endpoint. The interface may be a captive interface.

The method may also include obtaining the response to the command from the user.

Obtaining the response to the command may include providing the challenge to a personal security device via an operable connection; and receiving the response from the personal security device via the operable connection.

The personal security device may include one device selected from a list of devices consisting of a key fob, a smart card, a smart phone, and a tablet computer.

Making the determination may include making a first determination regarding whether the signature is verifiable using any trusted key; in a first instance of the determination where signature is verifiable using a trusted key: identifying permissions associated with the trusted key; making a second determination regarding whether any of the permissions associated with the trusted key grant use of the command through key possession; in a first instance of the second determination where at least one of permissions associated with the trusted key grants use of the command through key possession: concluding that the signature is verifiable using the key associated with the possession based permission for the command; and in a second instance of the second determination where none of the permissions associated with the trusted key grant use of the command through key possession: concluding that the signature is not verifiable using the key associated with the possession based permission for the command.

The determination may be made using permissions comprising a first group of permissions that are usable to verify signed requests for performances of commands by the endpoint device, and a second group of permissions that are usable to verify signed challenges for performances of the commands by the endpoint device.

The permissions may be defined by certificates that define the permissions.

The possession based permission for the command may require that a user demonstrate possession of a private key for the command to be performed by the endpoint device.

In an embodiment, a non-transitory media is provided. The non-transitory media may include instructions that when executed by a processor cause the computer-implemented method to be performed.

In an embodiment, a data processing system is provided. The data processing system may include the non-transitory media and a processor, and may perform the method when the computer instructions are executed by the processor.

Turning to FIG. 1, a block diagram illustrating a system in accordance with an embodiment is shown. The system shown in FIG. 1 may provide computer-implemented services. The computer implemented services may include any type and quantity of computer implemented services. For example, the computer implemented services may include data storage services, instant messaging services, database services, and/or any other type of service that may be implemented with a computing device.

To provide the computer implemented services, the system include endpoint devices 100. Each endpoint device (e.g., 102, 104) may provide similar and/or different computer implemented services, and may provide the computer implemented services independently and/or in cooperation with other endpoint devices.

To provide the services, each of endpoint devices 100 may host computer code that when executed causes the endpoint devices to provide corresponding computer services. Users may invoke performance of different functions of endpoint devices.

If malicious entities invoke performance of functions of the endpoint devices, the subsequent performance of the functions may compromise the endpoint devices, data maintained by the endpoint devices, and/or cause other undesired outcomes.

To limit invocation of functionality of endpoint devices 100 to prevent malicious entity use of endpoint devices 100, a permissions based model may be used to restrict invocation of the functions of endpoint devices 100. The permissions model may allow users to sign requests to invoke functions of the endpoint devices. The signatures may allow endpoint devices 100 to verify that these requests are trustworthy.

However, generation and signing of requests may require availability of infrastructure. In many types of environment, such infrastructure may be unavailable. Consequently, use of endpoint devices 100 secured with permission based models that verify signed requests may be limited undesirably by lack of available infrastructure.

In general, embodiments disclosed herein may provide methods, systems, and/or devices for securing the functionality of endpoint devices. To secure the functionality of the endpoint devices, the endpoint devices may implement a flexible permission verification model. The flexible permission verification model may allow functionalities of endpoint devices to be invoked through (i) signed request verification and (ii) challenge response verification.

In signed request verification, requests for performance of functionalities may include signatures that may be used to verify that the requestor has sufficient privilege to invoke the functionalities. In contrast, in challenge response verification, a requestor may only need to establish possession of a trusted key for functionalities of endpoint devices to be invoked. Consequently, the infrastructure necessary to establish signed requests need does not need to be available for challenge response verification to be completed. Accordingly, a sole endpoint device may perform a less complex public key encryption based verification prior to allowing functionalities of a endpoint device to be invoked.

By doing so, functionalities of endpoint devices may be invoked while limiting overhead required for securing the endpoint devices.

To provide the above noted functionality, the system of FIG. 1 may include endpoint devices 100 and management system 110. Each of these components is discussed below.

Endpoint devices 100 may provide computer implemented services that may be secured using a flexible model. The flexible model may allow for both signed request verification and challenge response verification for commands to be performed.

Figure 2A:
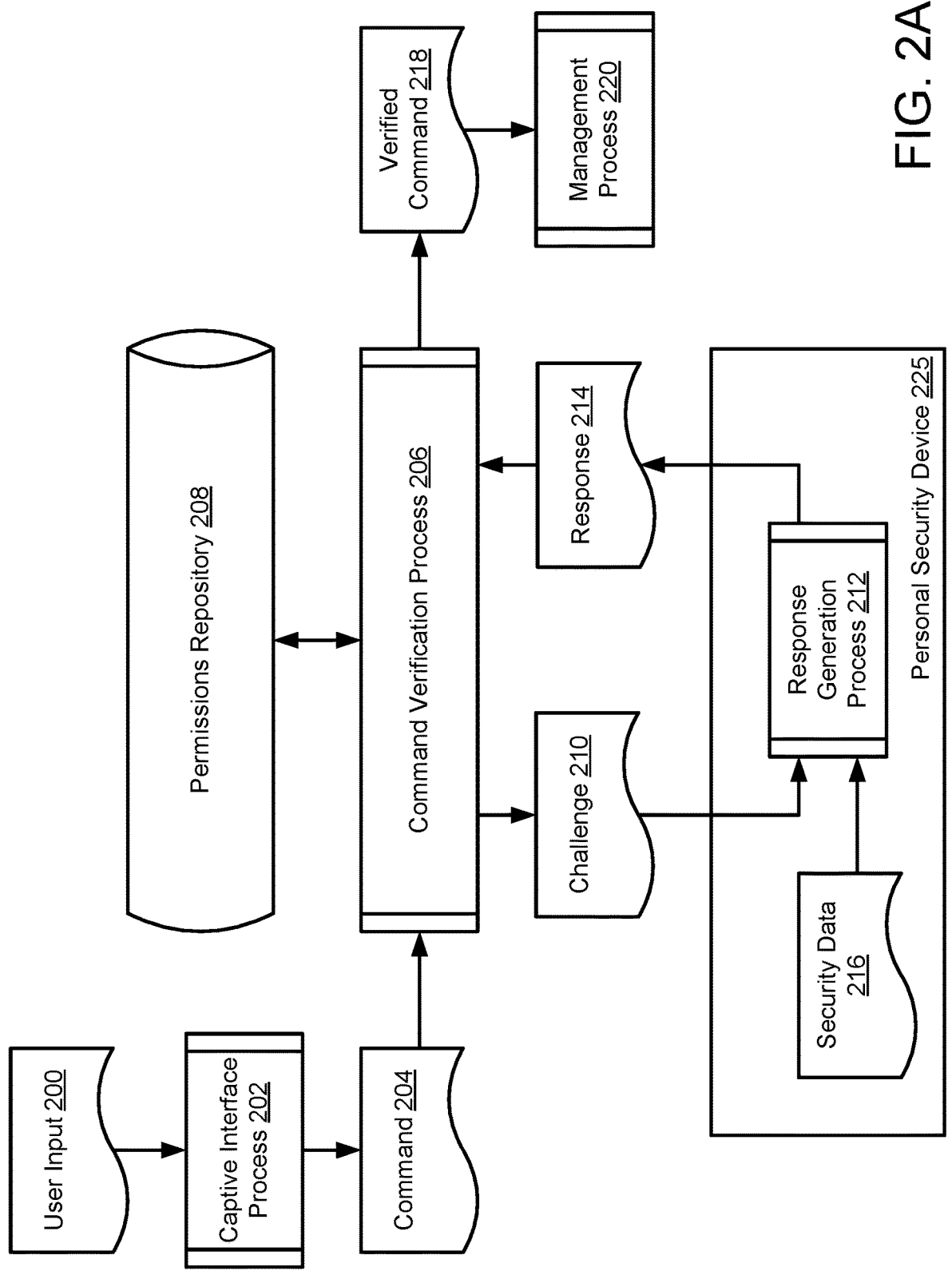
FIGS. 2A-2B show data flow diagrams in accordance with an embodiment.
Figure 2B:
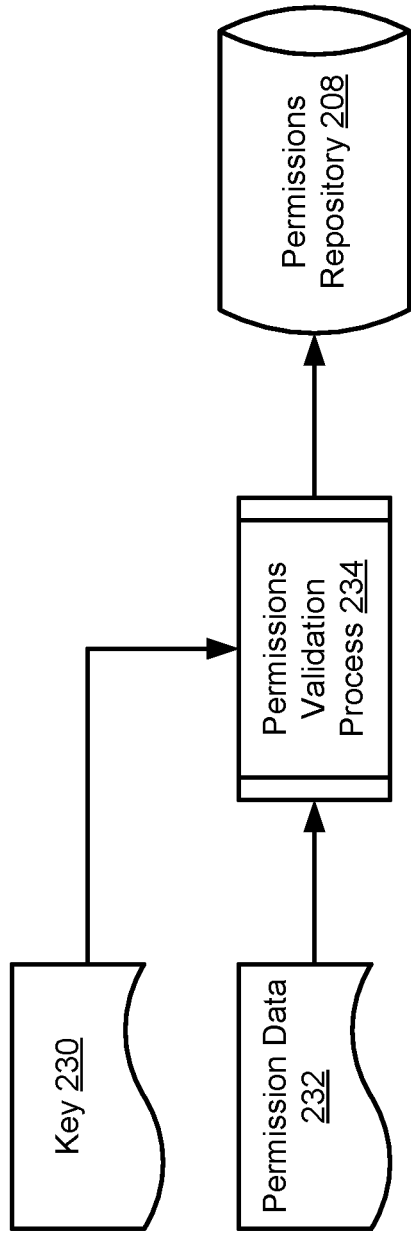

To provide the computer implemented services, an endpoint device may (i) obtain user input via an interface that indicates that a command is to be performed, (ii) prior to performing the command, present a challenge to a requestor (e.g., a user of the endpoint device), (iii) obtain a response to the challenge, (iv) attempt to verify the response, and (iv) if successfully verified, perform the command thereby performing a function/computer implemented service. Thus, an endpoint device may use challenge response verification to secure itself. An endpoint device may also (i) obtain signed requests for performance of commands, (ii) attempt to verify the signed requests, and (iv) if successfully verified, perform the commands thereby performing functions/computer implemented services. Thus, the endpoint device may also use signed request verification to secure itself. Refer to FIGS. 2A-2B for additional details regarding the operation of endpoint devices 100.

Management system 110 may manage keys used by endpoint devices 100 to secure themselves. To do so, management system 110 may (i) generate and maintain certificates that define permissions associated with different keys, and (ii) distribute the certificates to endpoint devices. The certificates may be signed using keys trusted by endpoint devices 100. Refer to FIGS. 2A-2B for additional details regarding the operation of management system 110.

Figure 3:
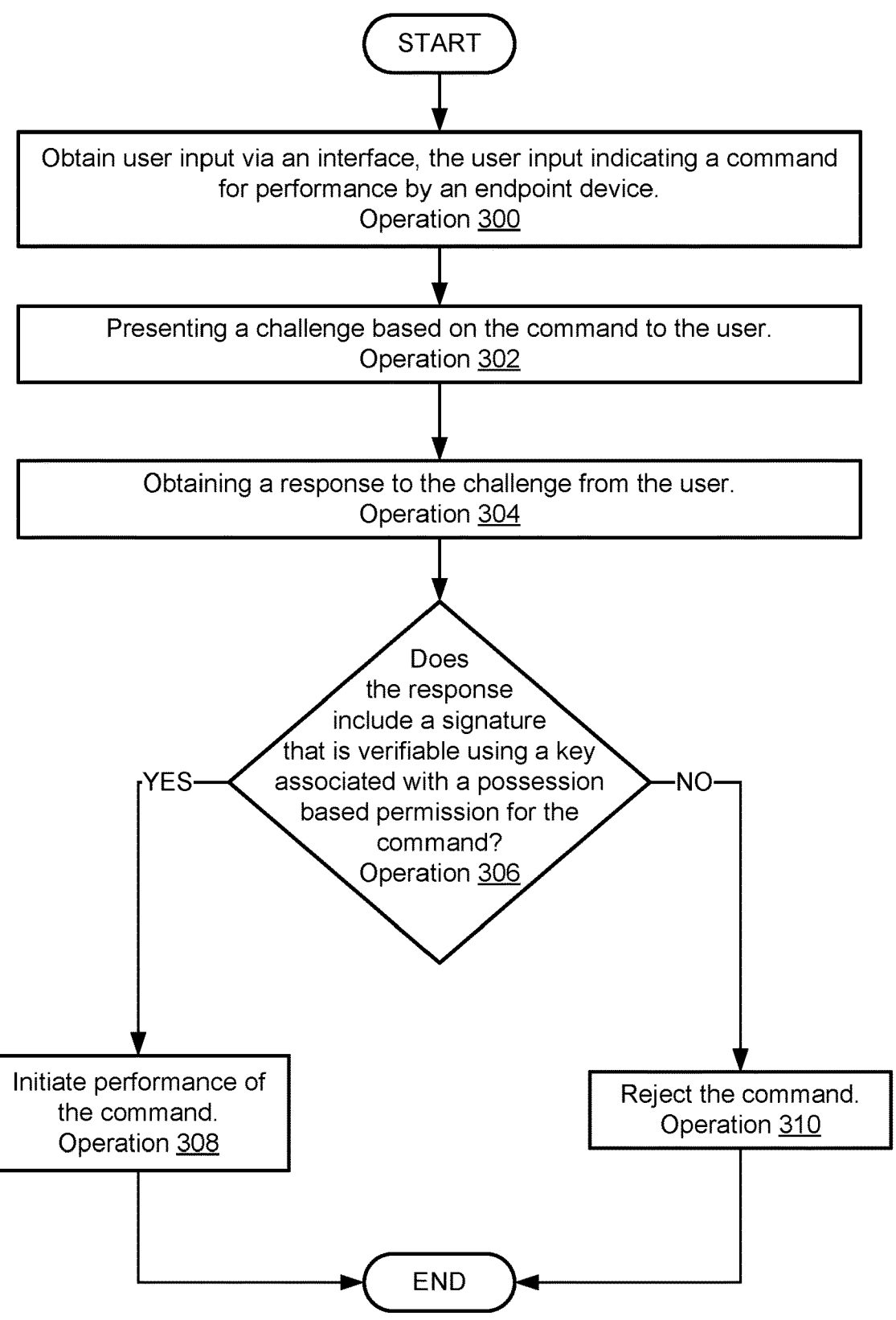
FIG. 3 shows a flow diagram illustrating method in accordance with an embodiment.

When providing their functionality, any of (and/or components thereof) endpoint devices 100 and/or management system 110 may perform all, or a portion, of the method illustrated in FIG. 3.

Any of (and/or components thereof) endpoint devices 100 and management system 110 may be implemented using a computing device (also referred to as a data processing system) such as a host or a server, a personal computer (e.g., desktops, laptops, and tablets), a "thin" client, a personal digital assistant (PDA), a Web enabled appliance, a mobile phone (e.g., Smartphone), an embedded system, local controllers, an edge node, and/or any other type of data processing device or system. For additional details regarding computing devices, refer to FIG. 4.

Any of the components illustrated in FIG. 1 may be operably connected to each other (and/or components not illustrated) with communication system 120. In an embodiment, communication system 120 includes one or more networks that facilitate communication between any number of components. The networks may include wired networks and/or wireless networks (e.g., and/or the Internet). The networks may operate in accordance with any number and types of communication protocols (e.g., such as the internet protocol).

While illustrated in FIG. 1 as including a limited number of specific components, a system in accordance with an embodiment may include fewer, additional, and/or different components than those components illustrated therein.

To further clarify embodiments disclosed herein, data flow diagrams in accordance with an embodiment are shown in FIGS. 2A-2B. In these diagrams, flows of data and processing of data are illustrated using different sets of shapes. A first set of shapes (e.g., 200, 204, etc.) is used to represent data structure, a second set of shapes (e.g., 202, 206, etc.) is used to represent processes performed using and/or that generate data, and a third set of shapes (e.g., 208) is used to represent large scale data structures such as databases.

Turning to FIG. 2A, a first data flow diagram in accordance with an embodiment is shown. The first data flow diagram may illustrate data used in and data processing performed in challenge response verification for commands to be performed by endpoint devices.

During challenge response verification, a user may utilize a captive interface to select commands to be performed by an endpoint device. The captive interface may capture user input 200 reflecting the selected commands. Prior to use of the captive interface, the user may be required to authenticate themselves to an endpoint device.

Once obtained, user input 200 may be ingested in captive interface process 202 to identify a command (e.g., 204) that has been invoked by a user. During captive interface process 202, for example, the user input (e.g., 200) may be used to identify the command being invoked by the user. For example, a user may position a cursor over a button and click a button of a human interface device to supply user input 200. Captive interface process 202 may process the user input (e.g., position of cursor above button at time button is pressed) to identify command 204 as being attempted to be invoked by the user.

Command 204 may be ingested by command verification process 206 to identify whether the command should be performed. During command verification process 206, a challenge may be presented to an invoker of the command.

To present the challenge to the invoker, the endpoint device may provide the challenge to a personal security device of the invoker. A personal security device may be a device that manages and allows use of keys by an invoker. The personal security device may be separate from an endpoint device. The personal security device may be implemented using, for example, a key fob, a smart phone, a smart card, and/or any other device that may manage keys (e.g., private keys) on behalf of the invoker. When provided to the personal security device, the personal security device may sign the challenge and/or perform other cryptographic operations using secrets maintained by the personal security device to obtain a response to the challenge. The challenge may be provided back to the endpoint device.

For example, challenge 210 may be a data structure that is provided to personal security device 225 via an operable connection (e.g., via universal serial bus, a wireless connection, etc.). When provided, challenge 210 may be ingested by response generation process 212 performed by personal security device 225. Response generation process 212 may generate response 214 using challenge 210 and security data 216. Security data 216 may include secrets such as private keys maintained for the invoker of the command (e.g., that provided user input 200).

In addition to signing, the personal security device may perform verification operations to validate that the challenge 210 should be signed. Challenge 210 may include information usable by personal security device 225 to perform various types of verification operations. The verification operations may include perform cryptographic verification, providing information regarding challenge 210 to a user of personal security device 225 and allowing the user to accept/reject signing of challenge 210, and/or other types of operations to reduce the likelihood of personal security device 225 signing data structures that are not challenges corresponding to invoked commands.

Once obtained, response 214 may be ingested by command verification process 206. Response 214 may be processed to identify whether it is signed using a trusted key that has been granted permissions that extend to command 204. To determine whether response 214 is appropriately signed, the signature from response 214 may attempt to be verified using keys from permissions repository 208. The signature may be checked using any type of verification algorithm. While described with respect to signatures, it will be appreciated that other types of mechanisms for verifying trust in commands may be used without departing from embodiments disclosed herein.

Permissions repository 208 may include certificates that grant different types of permissions to different keys. The permissions may be for different types of command and for different types of verification processes.

For example, some keys may be granted permissions for certain commands, but may only be granted when used in request verifications. In contrast, other keys may be granted permissions for certain commands, but are only granted when used in challenge response verification. Thus, some keys may only be usable to verify signatures of (i) requests for performances of commands or (ii) responses to challenges. Accordingly, a signature from a response may not be validated using a key limited to verification of signed requests for performance of commands and a signed request for performance of a command may not be validated using a key limited to verification of responses to challenges.

Permission repository 208 may be implemented using a data structure such as a database. Permission repository 208 may include certificates that grant authority to invoke functionalities of an endpoint device to keys. For example, the certificates may include delegation statements that define which functionalities may be invoked by corresponding key. The certificates may include public keys that allow the private keys (or more specifically holders of the private keys) to be identified. For example, the public key from a certificate may be used to verify that a response was signed using a corresponding private key.

The content of permission repository 208 may be obtained through any process. For example, a management service for permissions may distribute permissions relevant to different endpoint devices. Similarly, an onboarding or other type of domain management service may populate certificates to permissions repository 208.

While the certificates of permission repository 208 have been described with respect to including specific content, it will be appreciated that the certificates may include any type and quantity of information regarding permission delegated to different keys. For example, the certificates may include limits on (i) which keys permissions are delegated to, (ii) what has been delegated to the keys, (iii) locations to which the permissions extend (e.g., limited to certain domains, endpoint devices, etc.), (iv) whether the delegated permission can be further delegated, (v) which types of verifications that the keys can be used in (e.g., challenge response verification versus request verification), and/or other types of limitations regarding delegated permissions.

If response 214 includes a signature that is verifiable with a key in permissions repository 208 and the key has been delegated permission to invoke command 204, then command verification process 206 may designate command 204 as verified command 218, which may be performed by the endpoint device.

Verified command 218 may be ingested by management process 220 which may perform the command on behalf of the invoker of the command. For example, verified commands (e.g., 218) may be ingested by management process 220, which may initiate performance of the commands. Management process 220 may be implemented with, for example, a workload manager, an operating system or other type of management entity, an agent, etc.

Thus, using the flow shown in FIG. 2A, a system in accordance with an embodiment may facilitate performance of commands in a manner secured by proof of possession of keys to which permission has been delegated.

As discussed above, to verify whether commands that are invoked should be performed, permissions for keys used to sign challenges for the commands may be verified.

Turning to FIG. 2B, a second data flow diagram in accordance with an embodiment is shown. The second data flow diagram may illustrate data used in and data processing performed in establishing certificates that delegate permissions to keys.

To establish and facilitate use of certificates, certificates delegating permissions to keys may be generated, distributed, and populated to various permission repositories (e.g., 208). To do so, permissions validation process 234 may be performed. During permissions validation process, a key (e.g., 230) and permission data 232 for the key may be ingested and used to generate a certificate.

Key 230 may be a public key from a key pair. For example, key 230 may be a public key for which a corresponding private key has been assigned to a particular entity (e.g., a user). The public key may for signature generated using the private key to be validated using a signature verification algorithm.

Permission data 232 may include, for example, (i) information regarding delegated authority (e.g., permissions), (ii) limitations on the permissions, (iii) information regarding the entity delegating the authority, and/or other information usable to establish a certificate delegating the authority.

During permissions validation process 234, the entity delegating the authority (e.g., the delegator) may be validated as having authority to do so (e.g., by checking delegations of authority to that entity). If the delegator has sufficient authority, then a payload may be generated and signed using a private key of the delegator. The payload may include, for example, key 230, the information regarding the delegated authority, the limitations on the delegated authority, and/or other information usable to define the scope of authority delegated to key 230. The payload may be signed using any mechanism (e.g., any entity may manage the private key of the delegator).

Once obtained, the certificate may be distributed to any number of endpoint devices and populated into any number of permissions repositories maintained by the endpoint devices. The certificates may also be delegated, for example, to other entities such as personal security devices, intermediate security entities, etc.

Consequently, when an endpoint device attempts to verify a response to a challenge, the endpoint device may do so (i) using certificates stored in a permissions repository, (ii) using certificates provided along with the response, (iii) using certificates dynamically obtained from other entities (e.g., intermediate security entities such as key/permission managers), and/or other using certificates accessed in other manners.

During the verification process, the endpoint device may attempt to establish a chain of authority delegations to a root of trust for the endpoint device. For example, the endpoint device may use a particular public key as the root of trust. The endpoint device may identify verifiable delegations of authority from the root of trust to the public key included in a response to a challenge to determine whether a corresponding command should be performed.

For example, an endpoint device may trust public key X and a challenge may be signed using private key Z. Endpoint device may search the available certificates (or use data structures that include content derived from the certificates) to identify delegation of the authority of public key X to public key Z (corresponding to private key Z). The endpoint device may do so by identify (i) a first certificate signed using private key X (corresponding to public key X) and that includes a payload delegating the authority to public key Y, and (ii) a second certificate signed using private key Y (corresponding to public key Y) and that includes a payload delegating the authority to public key Z. These certificates may establish a chain of delegation between the root of trust and the public key usable to verify the signature of the challenge.

The content of permissions repository 208 may be populated at any point in time and may be updated over time.

As discussed above, the components of FIG. 1 may perform various methods to manage the operation of endpoint devices. FIG. 3 illustrates a method that may be performed by the components of the system of FIG. 1. In the diagram discussed below and shown in FIG. 3, any of the operations may be repeated, performed in different orders, and/or performed in parallel with or in a partially overlapping in time manner with other operations.

Turning to FIG. 3, a flow diagram illustrating a method for managing secure operation of endpoint devices in accordance with an embodiment is shown. The method may be performed by any of endpoint devices 100, management system 110, and/or other components of the system shown in FIG. 1.

Prior to operation 300, one or more certificates delegating authority to one or more keys may be generated and distributed to endpoint devices, personal security devices, and/or other entities.

At operation 300, user input is obtained using an interface. The interface may be a captive interface. The captive interface may be implemented using a terminal program, a console, or other type of interface. The interface may be presented by an endpoint device to a user. The user input may indicate a command for performance of a command by the endpoint device.

The user input may be obtained by receiving raw user input (e.g., a cursor location and button depression of a human interface device such as a mouse), and correlating the cursor location with a graphical element at the time of the button depression, and using the correlation to establish that the command corresponding to the graphical element is to be performed. For example, a user may position a cursor over a button (e.g., in a graphical user interface) labeled shutdown or restart, and press a button on a human interface device to indicate selection of the button. The selection of the button may be interpreted as the user requesting that the corresponding command (e.g., shut down, restart), be performed. Any type of command may be invoked for performance by an endpoint device in similar and/or different manners.

At operation 302, a challenge is presented to the user based on the command. The challenge may be presented by generating the challenge and providing the challenge to a personal security device. The challenge may be presented by adding information regarding the command to a data structure. The challenge may be provided to the personal security device by sending it over an operable connection to the personal security device.

Sending the challenge to the personal security device may cause a response to be generated. The response may be a signed copy of the challenge, an indication that the challenge is rejected, and/or another data structure with similar and/or different content that is signed. The challenge or other data structure may be signed using a private key maintained by the personal security device. Once generated, the response may be provided to the endpoint device.

Other data structures may be provided along with the response. For example, one or more certificates delegating permission for the command may be provided along with the response.

At operation 304, a response to the challenge is obtained from the user. The response may be obtained by receiving it from the personal security device and/or another device.

At operation 306, a determination is made regarding whether the response includes a signature that is verifiable using a key associated with a possession based permission for the command. The determination may be made by attempting to establish a chain of delegation of authority from a root of trust to a public key that is (i) usable to verify a signature of the response, and (ii) has possession based authority for the command delegated to it (e.g., by a certificate indicating that the key has permission to invoke the command and that can be used to verify challenge response signatures).

To identify whether a root of trust can be established, public keys to which appropriate authority has been delegated may be used to attempt to verify the signature of the response. If successfully verified, then it may be determined that the response includes the signature that is verifiable using a key associated with a possession based permission for the command.

If the response does include the signature, then the method may proceed to operation 308. Otherwise, the method may proceed to operation 310.

At operation 308, performance of the command is initiated. The command may be performed by the endpoint device by performing one or more actions.

The method may end following operation 308.

Returning to operation 306, the method may proceed to operation 310 following operation 306 when the response does not include the signature.

At operation 310, the command is rejected. The command may be rejected by not performing the command, by providing feedback to the user indicating that the command has been rejected, and/or performing other actions to indicate that the command is not going to be performed because it cannot be verified as being invoked for performance by an entity that has authority to invoke the command.

The method may end following operation 310.

Thus, using the method illustrated in FIG. 3, commands may be verified and initiated for execution without requiring that a user expressly establish requests for performance of the commands. Further, when verifying the commands, the commands may be performed through establishing that the invoker has possession of a key to which authority for invoking performance of the command has been delegated. Consequently, an endpoint device may not be required establish that authority for performance of the command has been delegated to the invoker. Rather, the invoker only needs to establish possession of a key to which the authority has been delegated for invoked commands to be performed for the invoker.

Figure 4:
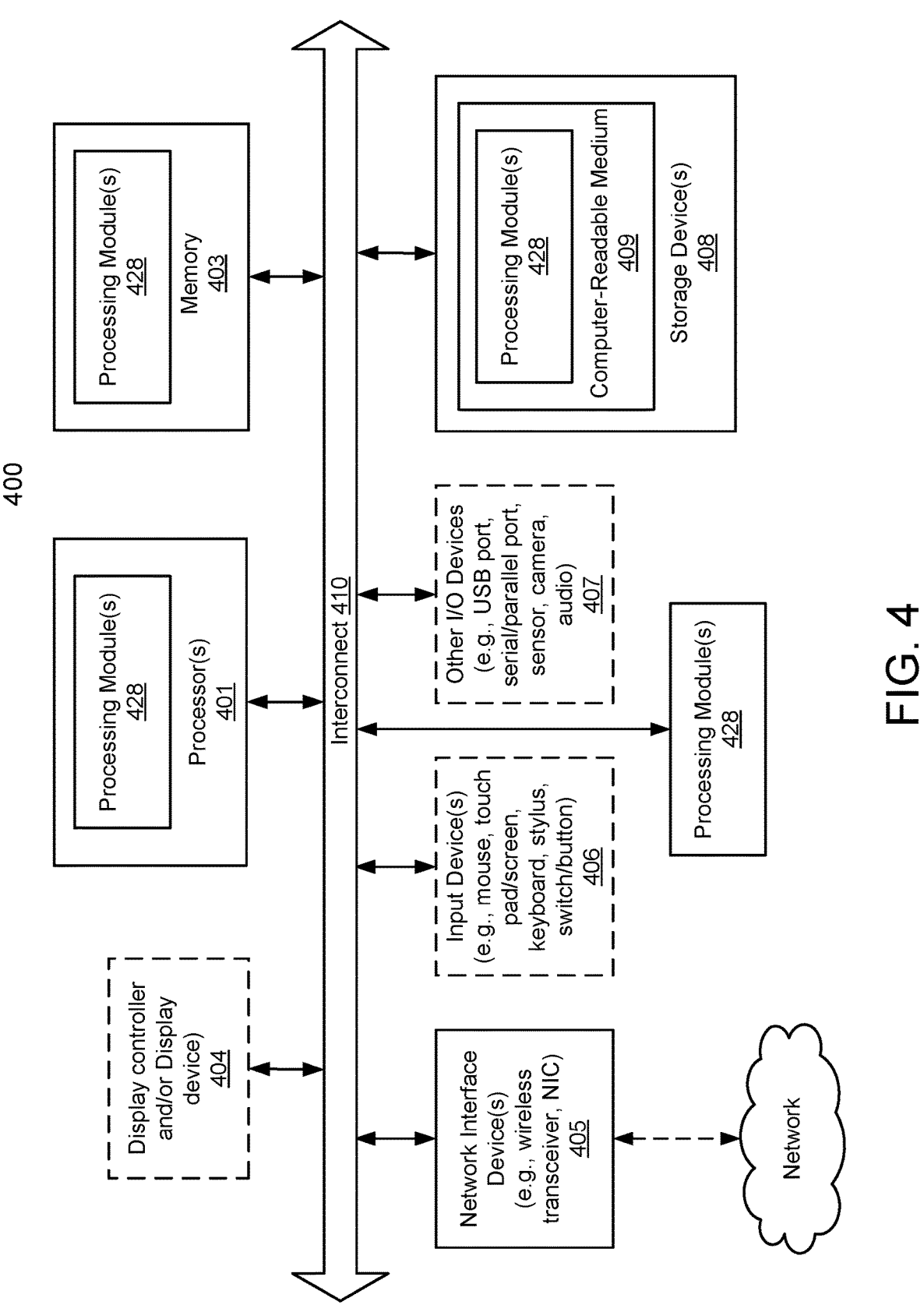
FIG. 4 shows a block diagram illustrating a data processing system in accordance with an embodiment.

Any of the components illustrated in FIGS. 1-2B may be implemented with one or more computing devices. Turning to FIG. 4, a block diagram illustrating an example of a data processing system (e.g., a computing device) in accordance with an embodiment is shown. For example, system 400 may represent any of data processing systems described above performing any of the processes or methods described above. System 400 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 400 is intended to show a high level view of many components of the computer system. However, it is to be understood that additional components may be present in certain implementations and furthermore, different arrangement of the components shown may occur in other implementations. System 400 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 400 includes processor 401, memory 403, and devices 405-407 via a bus or an interconnect 410. Processor 401 may represent a single processor or multiple processors with a single processor core or multiple processor cores included therein. Processor 401 may represent one or more general-purpose processors such as a microprocessor, a central processing unit (CPU), or the like. More particularly, processor 401 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 401 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 401, which may be a low power multi-core processor socket such as an ultra-low voltage processor, may act as a main processing unit and central hub for communication with the various components of the system. Such processor can be implemented as a system on chip (SoC). Processor 401 is configured to execute instructions for performing the operations discussed herein. System 400 may further include a graphics interface that communicates with optional graphics subsystem 404, which may include a display controller, a graphics processor, and/or a display device.

Processor 401 may communicate with memory 403, which in one embodiment can be implemented via multiple memory devices to provide for a given amount of system memory. Memory 403 may include one or more volatile storage (or memory) devices such as random access memory (RAM), dynamic RAM (DRAM), synchronous DRAM (SDRAM), static RAM (SRAM), or other types of storage devices. Memory 403 may store information including sequences of instructions that are executed by processor 401, or any other device. For example, executable code and/or data of a variety of operating systems, device drivers, firmware (e.g., input output basic system or BIOS), and/or applications can be loaded in memory 403 and executed by processor 401. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 400 may further include IO devices such as devices (e.g., 405, 406, 407, 408) including network interface device(s) 405, optional input device(s) 406, and other optional IO device(s) 407. Network interface device(s) 405 may include a wireless transceiver and/or a network interface card (NIC). The wireless transceiver may be a WI-FI® transceiver, an infrared transceiver, a BLUETOOTH® transceiver, a WIMAX® transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 406 may include a mouse, a touch pad, a touch sensitive screen (which may be integrated with a display device of optional graphics subsystem 404), a pointer device such as a stylus, and/or a keyboard (e.g., physical keyboard or a virtual keyboard displayed as part of a touch sensitive screen). For example, input device(s) 406 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 407 may include an audio device. An audio device may include a speaker and/or a microphone to facilitate voice-enabled functions, such as voice recognition, voice replication, digital recording, and/or telephony functions. Other IO devices 407 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 407 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 410 via a sensor hub (not shown), while other devices such as a keyboard or thermal sensor may be controlled by an embedded controller (not shown), dependent upon the specific configuration or design of system 400.

To provide for persistent storage of information such as data, applications, one or more operating systems and so forth, a mass storage (not shown) may also couple to processor 401. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 401, e.g., via a serial peripheral interface (SPI). This flash device may provide for non-volatile storage of system software, including a basic input/output software (BIOS) as well as other firmware of the system.

Storage device 408 may include computer-readable storage medium 409 (also known as a machine-readable storage medium or a computer-readable medium) on which is stored one or more sets of instructions or software (e.g., processing module, unit, and/or processing module/unit/logic 428) embodying any one or more of the methodologies or functions described herein. Processing module/unit/logic 428 may represent any of the components described above. Processing module/unit/logic 428 may also reside, completely or at least partially, within memory 403 and/or within processor 401 during execution thereof by system 400, memory 403 and processor 401 also constituting machine-accessible storage media. Processing module/unit/logic 428 may further be transmitted or received over a network via network interface device(s) 405.

Computer-readable storage medium 409 may also be used to store some software functionalities described above persistently. While computer-readable storage medium 409 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of embodiments disclosed herein. The term "computer-readable storage medium" shall accordingly be taken to include, but not be limited to, solid-state memories, and optical and magnetic media, or any other non-transitory machine-readable medium.

Processing module/unit/logic 428, components and other features described herein can be implemented as discrete hardware components or integrated in the functionality of hardware components such as ASICS, FPGAs, DSPs or similar devices. In addition, processing module/unit/logic 428 can be implemented as firmware or functional circuitry within hardware devices. Further, processing module/unit/logic 428 can be implemented in any combination hardware devices and software components.

Note that while system 400 is illustrated with various components of a data processing system, it is not intended to represent any particular architecture or manner of interconnecting the components; as such details are not germane to embodiments disclosed herein. It will also be appreciated that network computers, handheld computers, mobile phones, servers, and/or other data processing systems which have fewer components or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein.

In the foregoing specification, embodiments have been described with reference to specific exemplary embodiments thereof. It will be evident that various modifications may be made thereto without departing from the broader spirit and scope of the embodiments disclosed herein as set forth in the following claims. The specification and drawings are, accordingly, to be regarded in an illustrative sense rather than a restrictive sense.

What is claimed is:

1. A method for managing operation of an endpoint device, the method comprising:
  receiving, by the endpoint device, a command request for a command to be performed by the endpoint device;
  presenting, by the endpoint device to a user, a challenge based on the command that is to be performed by the endpoint device;
  making a determination regarding whether a response to the challenge comprises a signature that is verifiable using a permissions repository comprising a first trusted key associated with challenge-based permissions for the command and a second trusted key associated with request-based permissions for the command;
  in a first instance where the signature is verifiable using any trusted key associated with the permissions repository, designate the command as a verified command and initiate performance of the command; and
  in a second instance where the signature is not verifiable using any trusted key of the permissions repository, deny performance of the command,
  wherein the determination is made using certificates that define permissions, where a first type of certificate corresponds to the first trusted key and is usable to verify signed challenges for performances of commands by the endpoint device and a second type of certificate corresponds to the second trusted key and is usable to verify signed command requests for performances of the commands by the endpoint device.

2. The method of claim 1, further comprising:
  obtaining user input via an interface, the user input indicating the command to be performed by the endpoint device.

3. The method of claim 2, wherein the interface is a captive interface.

4. The method of claim 1, further comprising:
  obtaining the response to the command from the user.

5. The method of claim 4, wherein obtaining the response to the command comprises:
  providing the challenge to a personal security device via an operable connection; and
  receiving the response from the personal security device via the operable connection.

6. The method of claim 5, wherein the personal security device comprises one device selected from a list of devices consisting of a key fob, a smart card, a smart phone, and a tablet computer.

7. The method of claim 1, wherein verifying the signature comprises:
  making a first determination regarding whether the signature is verifiable using the first trusted key or the second trusted key;
  in a first instance of the first determination where the signature is verifiable using the first trusted key:
  identifying the challenge-based permissions associated with the first trusted key; and
  directly designating the command as the verified command to initiate the performance of the command;

in a second instance of the first determination where the signature is verifiable using the second trusted key:

making a second determination regarding whether a chain of authority delegations grant use of the command through key possession between a root of trust and the second trusted key;

in a first instance of the second determination where the second trusted key is delegated use of the command through other keys of the permissions repository, designating the command as the verified command to initiate the performance of the command; and in a second instance of the second determination where none of the other keys of the permissions repository delegate use of the command through key possession: concluding that the signature is not verifiable.

8. The method of claim 1, wherein the signature corresponds to a private key for the command to be performed by the endpoint device.

9. A non-transitory machine-readable medium having instructions stored therein, which when executed by at least one processor, cause a system to perform system first operations for managing operation of an endpoint device, the system first operations comprising:

receiving, by the endpoint device, a command request for a command to be performed by the endpoint device;

presenting, by the endpoint device to a user, a challenge based on the command that is to be performed by the endpoint device;

making a determination regarding whether a response to the challenge comprises a signature that is verifiable using a permissions repository comprising a first trusted key associated with challenge-based permissions for the command and a second trusted key associated with request-based permissions for the command;

in a first instance where the signature is verifiable using any trusted key associated with the permissions repository, designate the command as a verified command and initiate performance of the command; and in a second instance where the signature is not verifiable using any trusted key of the permissions repository, deny performance of the command, wherein the determination is made using certificates that define permissions, where a first type of certificate corresponds to the first trusted key and is usable to verify signed challenges for performances of commands by the endpoint device and a second type of certificate corresponds to the second trusted key and is usable to verify signed command requests for performances of the commands by the endpoint device.

10. The non-transitory machine-readable medium of claim 9, wherein the operations further comprise:

obtaining user input via an interface, the user input indicating the command to be performed by the endpoint device.

11. The non-transitory machine-readable medium of claim 10, wherein the interface is a captive interface.

12. The non-transitory machine-readable medium of claim 9, wherein the operations further comprise:

obtaining the response to the command from the user.

13. The non-transitory machine-readable medium of claim 12, wherein obtaining the response to the command comprises:

providing the challenge to a personal security device via an operable connection; and receiving the response from the personal security device via the operable connection.

14. The non-transitory machine-readable medium of claim 9, wherein verifying the signature comprises:

making a first determination regarding whether the signature is verifiable using the first trusted key or the second trusted key;

in a first instance of the first determination where the signature is verifiable using the first trusted key:

identifying the challenge-based permissions associated with the first trusted key; and directly designating the command as the verified command to initiate the performance of the command;

in a second instance of the first determination where the signature is verifiable using the second trusted key:

making a second determination regarding whether a chain of authority delegations grant use of the command through key possession between a root of trust and the second trusted key;

in a first instance of the second determination where the second trusted key is delegated use of the command through other keys of the permission repository, designating the command as the verified command to initiate the performance of the command; and in a second instance of the second determination where none of the other keys of the permissions repository delegate use of the command through key possession: concluding that the signature is not verifiable.

15. An endpoint device, comprising:

a processor, and a memory coupled to the processor to store instructions, which when executed by the processor, cause the endpoint device to perform operations for managing operation of the endpoint device, the operations comprising:

receiving, by the endpoint device, a command request for a command to be performed by the endpoint device;

presenting, by the endpoint device to a user, a challenge based on the command that is to be performed by the endpoint device;

making a determination regarding whether a response to the challenge comprises a signature that is verifiable using a permissions repository comprising a first trusted key associated with challenge-based permissions for the command and a second trusted key associated with request-based permissions for the command;

in a first instance where the signature is verifiable using any trusted key associated with the permissions repository, designate the command as a verified command and initiate performance of the command; and in a second instance where the signature is not verifiable using any trusted key of the permissions repository, deny performance of the command, wherein the determination is made using certificates that define permissions, where a first type of certificate corresponds to the first trusted key and is usable to verify signed challenges for performances of commands by the endpoint device and a second type of certificate corresponds to the second trusted key and is usable to verify signed command requests for performances of the commands by the endpoint device.

16. The endpoint device of claim 15, wherein the operations further comprise:

obtaining user input via an interface, the user input indicating the command to be performed by the endpoint device.

17. The endpoint device of claim 16, wherein the interface is a captive interface.

18. The endpoint device of claim 15, wherein the operations further comprise:

obtaining the response to the command from the user.

19. The endpoint device of claim 18, wherein obtaining the response to the command comprises:

providing the challenge to a personal security device via an operable connection; and receiving the response from the personal security device via the operable connection.

20. The endpoint device of claim 15, wherein verifying the signature comprises:

making a first determination regarding whether the signature is verifiable using the first trusted key or the second trusted key;

in a first instance of the first determination where the signature is verifiable using the first trusted key:

identifying the challenge-based permissions associated with the first trusted key; and directly designating the command as the verified command to initiate the performance of the command;

in a second instance of the first determination where the signature is verifiable using the second trusted key:

making a second determination regarding whether a chain of authority delegations grant use of the command through key possession between a root of trust and the second trusted key;

in a first instance of the second determination where the second trusted key is delegated use of the command through other keys of the permission repository, designating the command as the verified command to initiate the performance of the command; and in a second instance of the second determination where none of the other keys of the permissions repository delegate use of the command through key possession:

concluding that the signature is not verifiable.

* * * * *